United States Patent
Teboulle et al.

(10) Patent No.: US 12,418,402 B2
(45) Date of Patent: Sep. 16, 2025

(54) METHOD FOR TRANSMITTING AND RECEIVING CONSUMPTION DATA AND DEVICES IMPLEMENTING SAID METHODS

(71) Applicant: SAGEMCOM ENERGY & TELECOM SAS, Rueil Malmaison (FR)

(72) Inventors: Henri Teboulle, Rueil Malmaison (FR); Jean-Paul Lecappon, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 173 days.

(21) Appl. No.: 18/090,027

(22) Filed: Dec. 28, 2022

(65) Prior Publication Data

US 2023/0216660 A1    Jul. 6, 2023

(30) Foreign Application Priority Data

Jan. 3, 2022 (FR) .................................. 2200007
Mar. 24, 2022 (FR) .................................. 2202603

(51) Int. Cl.
  *H04L 9/06* (2006.01)
  *H04L 9/30* (2006.01)
  *G06Q 50/06* (2012.01)

(52) U.S. Cl.
  CPC .......... *H04L 9/0643* (2013.01); *H04L 9/3066* (2013.01); *G06Q 50/06* (2013.01)

(58) Field of Classification Search
  CPC ... H04L 9/0643; H04L 9/3066; H04L 9/3247; H04L 63/0442; H04L 63/126; G06Q 50/06; H04Q 9/00; H04Q 2209/60
  See application file for complete search history.

(56) References Cited

U.S. PATENT DOCUMENTS

| 2016/0163177 A1* | 6/2016 | Klicpera | E03B 7/071 |
| | | | 137/59 |
| 2017/0103355 A1* | 4/2017 | Eberhardt | H04W 12/0431 |
| 2020/0012634 A1* | 1/2020 | Eberhardt | G01M 99/00 |

FOREIGN PATENT DOCUMENTS

| EP | 2552048 A1 | 1/2013 |
| GB | 2588647 A | 5/2021 |

OTHER PUBLICATIONS

Jan. 11, 2023 Search Report issued in French Application No. 2202603.

(Continued)

*Primary Examiner* — Mohammed Waliullah
(74) *Attorney, Agent, or Firm* — Williams Mullen; R. Brian Drozd

(57) ABSTRACT

A method for transmitting consumption data by a meter to a meter data management system is described. The meter obtains (S301) consumption data, the data being obtained by metrology software. It generates (S302) a hashcode from a triplet comprising a serial number of the meter, a cyclic redundancy code calculated from the metrology software and a certificate number certifying that the meter is authorised to be used for invoicing consumption. It next encrypts (S304) the hashcode with a private key known solely to the meter, in order to obtain a signature. Finally, it transmits (S306), to the system managing said consumption data, a frame comprising an identifier of the meter, the consumption data obtained and the signature.

11 Claims, 5 Drawing Sheets

(56) References Cited

OTHER PUBLICATIONS

EU Directive 2014/32/EU of the European Parliament and of the council; Official Journal of the European Union; pp. 1-102; Feb. 26, 2014; Internet Extract: URL: https://eur-lex.europa.eu/eli/dir/2014/32/oj.

* cited by examiner

METHOD FOR TRANSMITTING AND RECEIVING CONSUMPTION DATA AND DEVICES IMPLEMENTING SAID METHODS

TECHNICAL FIELD

At least one embodiment relates to a method for transmitting consumption data by a meter intended for a system for managing said consumption data. At least one other embodiment relates to a method for receiving consumption data. Devices implementing said transmission and reception methods are also described.

PRIOR ART

Smart meters of the electricity meter, thermal energy meter or fluid, e.g. gas or water, meter type are known, which comprise communication interfaces enabling an automated management system to make a remote collection of consumption data. For example, these smart meters comprise one (or more) communication interface(s) of the PLC type (the acronym for powerline communication) and/or of the radio type. They then transmit, by these communication interfaces, the consumption data of a customer, e.g. in the form of frames, to transfer these consumption data, at regular intervals or not, to an information system processing them in a centralised manner. These consumption data are used by the information system in particular for operations of invoicing the consuming customer by a service provider. For this purpose, metrology methods or software are used by the meters to generate these consumption data from measurements that must meet the requirements of legal metrology. Metrology is the science of measurement and its applications. It comprises all the theoretical and practical aspects of measurements. Legal metrology is a part of metrology that relates to the activities that result from regulatory requirements and apply to measurements, units of measurement and measurement instruments. Thus legal metrology further includes the establishment of legal requirements, the checking/evaluation of the conformity of regulated products and of regulated activities, the supervision of regulated products and of regulated activities and the establishment of infrastructures necessary to the traceability of regulated measurements and of measuring instruments. For example, Directive 2014/32/UE, known by the acronym MID, standing for «Measuring Instruments Directive», regulates the marketing of a majority of the measuring instruments (e.g. electricity, gas, thermal energy or water meters) covered by legal metrology. It fixes the technical requirements applicable to their design and construction. Thus only MID-certified meters can be used for invoicing. At the time of certification an MID certificate number is attributed to the meter by the certification body.

The consumption data used for invoicing must be free from any error to avoid any disputes relating to a contesting of their values. Errors may result in particular from a modification, during transmission thereof, of the frames comprising the consumption data. They may also result from the use by a meter of an incorrect, e.g. obsolete, version of the metrology software.

Currently, in the case of a dispute about the value of the consumption data between a customer and the service provider, one solution consists, for the service provider, in sending an operative to the premises of the customer to make a direct reading of the consumption data on a display of the meter. Such a solution is not satisfactory since it requires firstly for the meter to be equipped with a display and secondly for the operative to travel to the home of the customer, which is expensive.

It is desirable to overcome these various drawbacks of the prior art. It is in particular desirable to propose a method for transmitting data that is reliable and that in particular makes it possible to certify that the consumption data received by the information system do indeed come from the certified software from the meter from which they are supposed to come and that furthermore they were generated by a correct version of the metrology software.

DISCLOSURE OF THE INVENTION

At least one embodiment relates to a method for transmitting consumption data by a meter to a meter data management system. The method comprises the following steps implemented by said meter:
  obtaining consumption data, said data being obtained by a metrology software;
  generating a hashcode from a triplet comprising a serial number of said meter, a cyclic redundancy code calculated from said metrology software and a certificate number certifying that said meter is authorised to be used for invoicing consumption;
  encrypting said hashcode with a private key known solely to the meter, said encrypted hashcode being a signature; and
  transmitting, to the system managing said consumption data, a frame comprising an identifier of said meter, said consumption data obtained and said signature.

The method described advantageously makes it possible to certify that the consumption data received does indeed come from the correct meter, i.e. from the meter supposed to have sent said consumption data, and that furthermore this consumption data was obtained by a correct version of the metrology software.

According to a particular embodiment, generating a hashcode comprises applying a hash function to said triplet.

According to a particular embodiment, the hash function belongs to the set of hash functions comprising:
  SHA-224 of the family SHA-3;
  SHA-256 of the family SHA-3;
  SHA-384 of the family SHA-3;
  SHA-512 of the family SHA-3;
  SHA-224 of the family SHA-2;
  SHA-256 of the family SHA-2;
  SHA-384 of the family SHA-2;
  SHA-512 of the family SHA-2;
  MD-4;
  MD-5; and
  SHA-1.

According to a particular embodiment, encrypting said hashcode with a private key known solely to the meter comprises applying an elliptic curve asymmetric encryption.

According to a particular embodiment, said consumption data are data on consumption of electricity, gas, petrol, thermal energy or water.

At least one embodiment relates to a method for receiving consumption data by a system for managing said consumption data, said system for managing said consumption data storing in memory, for each meter in a set of meters, a triplet comprising a serial number of said meter, a cyclic redundancy code of a metrology software and an associated certificate number certifying that said meter is authorised to be used for invoicing consumption. The method comprises the following steps performed by said system for managing said consumption data:

receiving a frame comprising an identifier of a meter, consumption data and a signature;
decrypting said signature with a public key associated with the meter identified by said identifier;
generating a hashcode from said triplet associated in said memory with said meter identified by said identifier;
comparing said decrypted signature and said generated hashcode and, in the case of inequality, sending an alarm signal.

At least one embodiment relates to a method for transmitting consumption data by a meter to a system for managing said consumption data, said system for managing said consumption data storing in memory, for each meter in a set of meters, a triplet comprising a serial number of said meter, a cyclic redundancy code of a metrology software and an associated certificate number certifying that said meter is authorised to be used for invoicing consumption. The method comprises the following steps performed by said meter:
obtaining consumption data, said data being obtained by a metrology software;
generating a hashcode from a triplet comprising a serial number of said meter, a cyclic redundancy code calculated from said metrology software and a certificate number certifying that said meter is authorised to be used for invoicing consumption;
encrypting said hashcode with a private key known solely to the meter, said encrypted hashcode being a signature; and
transmitting, to the system managing said consumption data, a frame comprising an identifier of said meter, said consumption data obtained and said signature.

The method further comprises the following steps performed by said system for managing said consumption data:
receiving said frame;
decrypting said signature with a public key associated with the meter identified by said identifier;
generating a hashcode from said triplet associated in said memory with said meter identified by said identifier; and
comparing said decrypted signature and said generated hashcode and, in the case of inequality, sending an alarm signal.

At least one embodiment relates to a meter configured to transmit consumption data to a system for managing said consumption data.

The meter comprises:
means for obtaining consumption data, said data being obtained by a metrology software;
means for generating a hashcode from a triplet comprising a serial number of said meter, a cyclic redundancy code calculated from said metrology software and a certificate number certifying that said meter is authorised to be used for invoicing consumption;
means for encrypting said hashcode with a private key known solely to the meter, said encrypted hashcode being a signature; and
mean for transmitting, to the system managing said consumption data, a frame comprising an identifier of said meter, said consumption data obtained and said signature.

At least one embodiment relates to a system for managing data from meters storing in memory, for each meter in a set of meters, a triplet comprising a serial number of said meter, a cyclic redundancy code of a metrology software and an associated certificate number certifying that said meter is authorised to be used for invoicing consumption, said meter data management system comprising:
means for receiving a frame comprising an identifier of a meter, consumption data and a signature;
means for decrypting said signature with a public key associated with the meter identified by said identifier;
means for generating a hashcode from said triplet associated in said memory with said meter identified by said identifier; and
means for comparing said decrypted signature and said generated hashcode and, in the case of inequality, sending an alarm signal.

At least one embodiment relates to an automated management system configured to make a remote collection of consumption data, said automated management system comprising at least one meter according to one of the preceding embodiments and a meter data management system according to one of the preceding embodiments.

At least one embodiment relates to a computer program product comprising instructions for implementing the transmission method or the reception method according to any one of the embodiments described previously, when said program is executed by a processor.

At least one embodiment relates to a storage medium that stores a computer program comprising instructions for implementing the transmission method or the reception method according to any one of the embodiments described previously, when said program is executed by a processor.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
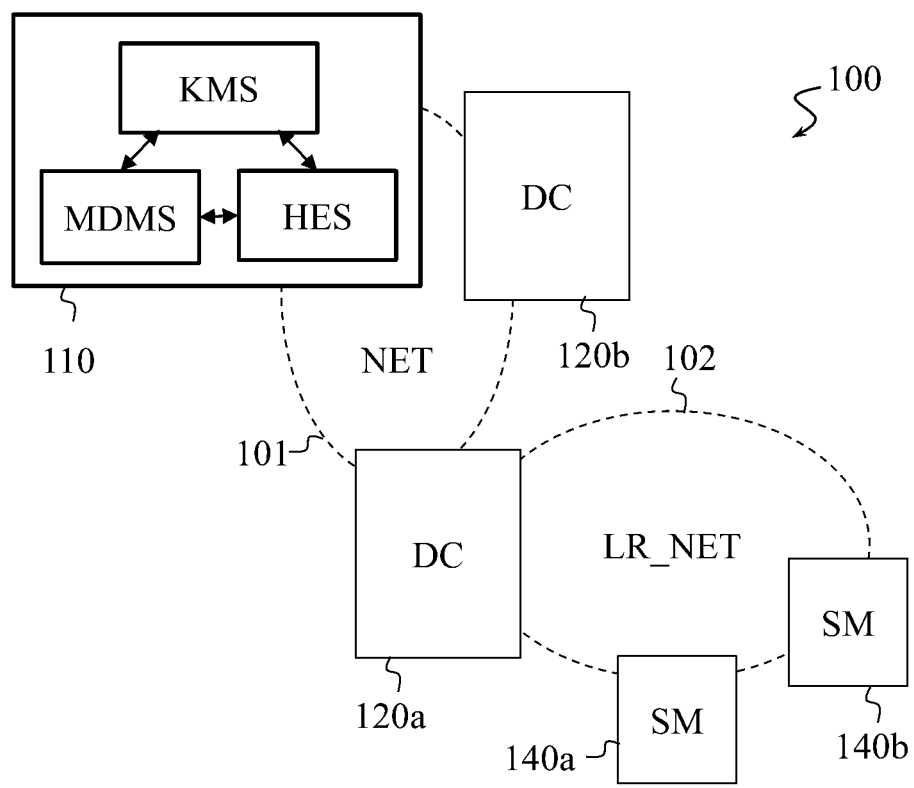
FIG. 1 illustrates schematically an automated management system configured to make a reading of consumption data from communicating metering devices according to a particular embodiment.

FIG. 1 thus illustrates schematically an automated management system 100 wherein the present invention can be implemented. The automated management system 100 is configured to make a reading of consumption data from communicating metering devices 140a and 140b, e.g. smart meters SM. The smart meters SM 140a and 140b are for example electricity meters, gas meters, thermal energy meters or water meters or any other type of fluid, e.g. petrol, the consumption of which can be measured by means of a metrology software. These smart meters 140a and 140b have the ability to communicate by radio and/or PLC transmission with an information system IS 110. The information system IS 110 comprises a head-end system HES, a meter data management system MDMS and a key management system KMS.

The role of the information system IS 110 is to monitor metering operations performed by the smart meters SM 140a and 140b. To do this the information system IS 110 delegates the management of a collecting network to data concentrators DC. Two DCs 120a, 120b are shown on FIG. 1 by way of example. The automated management system 100 typically comprises a plurality of such DCs that send frames to the head-end system HES.

The various systems of the IS communicate with each other through a network (not shown on FIG. 1), e.g. a private network of the VPN type or the internet. The head-end system HES exchanges with the data concentrators DC 120a, 120b by means of a communication network NET 101. For example, the communication network NET 101 is the internet. In other embodiments, the communication network NET 101 is a wireless communication network, for example GPRS («General Packet Radio Service»), UMTS («Universal Mobile Telecommunication System»), LTE («Long-Term Evolution»), NB-IoT («Narrowband Internet of Things»), 2G, 3G, 4G or 5G. Each data concentrator DC 120a, 120b manages the communications with a set of smart meters SM by means of a communication network LR_NET 102. The communication network LR_NET 102 is a communication network of the PLC type (the acronym for "powerline communications") or a wireless communication network, e.g. long-range wireless network. Preferentially, the communication network LR_NET 102 is a low-power wide-area network LPWAN, for example in accordance with LoRaWAN or NB-IoT technology. According to a variant, a smart meter SM can communicate with a data concentrator DC using two distinct networks, e.g. a PLC network and a wireless network.

By means of the communication network LR_NET 102, the data concentrator DC communicates directly or indirectly (e.g. through smart meters to which a role of relay REL is attributed) with the smart meters SM 140a, 140b that are paired with it.

Thus the data concentrators DC periodically collect and send, for example one to several times a day, to the information system IS 110, consumption data coming from the smart meters SM 140a, 140b. that are paired with it.

In a variant embodiment that is not shown in FIG. 1, a smart meter SM can communicate directly with the IS 110 without passing through a DC.

In the context of legal metrology, a cyclic redundancy code or CRC is calculated (CRC32 calculated in 32 bits by means of a standardised polynomial) in conformity when a metrology software is generated. This cyclic redundancy code is integrated in the metrology software. The metrology software is validated and next sent as certification to obtain MID certification. Once the MID certification has been obtained, a certification number is transmitted to the meter data management system MDMS, which then stores in memory, for each MID-certified meter, a CRC code of the metrology software and an MID certification number in association with the serial number of the meter in question.

Figure 2:
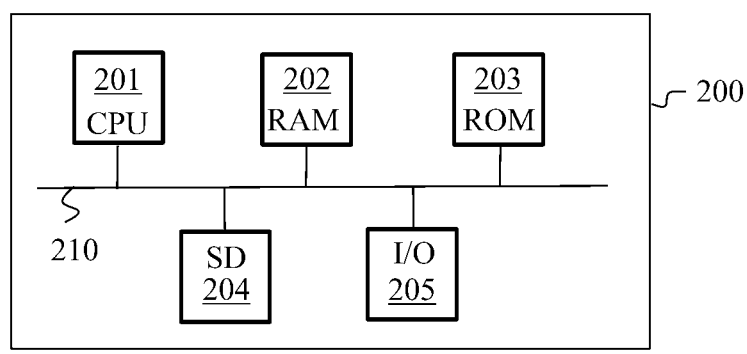
FIG. 2 illustrates schematically an example of hardware architecture of a smart meter of an automated management system according to a particular embodiment.

FIG. 2 illustrates schematically an example of hardware architecture of a smart meter 200 of an automated management system 100 according to a particular embodiment.

The smart meter 200 comprises, connected by means of a communication bus 210: a processor or CPU (central processing unit) 201; a random access memory RAM 202; a read only memory ROM 203, for example a flash memory; a data storage device such as a hard disk HDD (hard disk drive), or a storage medium reader, such as an SD (Secure Digital) card reader 204; at least one input/output interface I/O 205, in particular an interface for communicating with the communication network LR_NET 102, where applicable with the communication network NET 101 in the case of direct communication with the IS.

The processor 201 is capable of executing instructions loaded in the RAM 202 from the ROM 203, from an external memory (not shown), from a storage medium, such as an SD card, or from a communication network (not shown). When the smart meter 200 is powered up, the processor 201 is capable of reading instructions from the RAM 202 and executing them. These instructions form a computer program causing the implementation, by the processor 201, of the steps and methods described below in relation to FIG. 4.

All or some of the steps and methods described below in relation to FIG. 4 can thus be implemented in software form by executing a set of instructions by a programmable machine, such as a DSP (digital signal processor), or a microcontroller, or be implemented in hardware form by a machine or a dedicated component (chip) or a dedicated set of components (chipset) such as an FPGA (field-programmable gate array) or an ASIC (application-specific integrated circuit). In general terms, the smart meter 200 comprises electronic circuitry arranged and configured to implement the following steps and methods in relation to FIG. 4.

Figure 3:
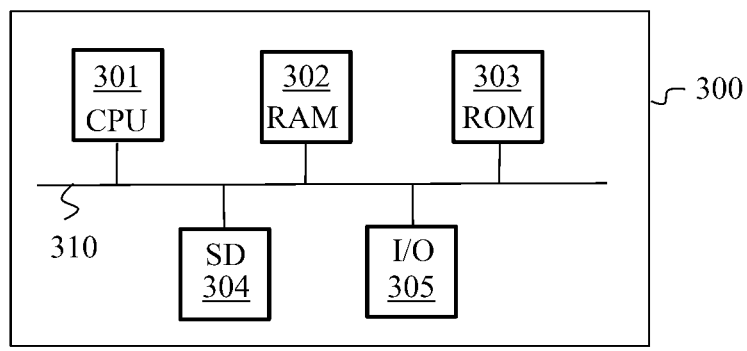
FIG. 3 illustrates schematically an example of hardware architecture of a meter data management system according to a particular embodiment.

FIG. 3 illustrates schematically an example of hardware architecture of a meter data management system MDMS 300 of the automated management system 100 according to a particular embodiment.

The meter data management system MDMS 300 comprises, connected by a communication bus 310: a processor or CPU (central processing unit) 301; a random access memory RAM 302; a read only memory ROM 303, for example a flash memory; a data storage device such as a hard disk HDD (hard disk drive), or a storage medium reader, such as an SD (Secure Digital) card reader 304; at least one input/output interface I/O 305 that comprises in particular an interface for communicating with the network NET.

The processor 301 is capable of executing instructions loaded in the RAM 302 from the ROM 303, from an external memory (not shown), from a storage medium, such as an SD card, or from a communication network (not shown). When the meter data management system MDMS 300 is powered up, the processor 301 is capable of reading instructions from the RAM 302 and executing them. These instructions form a computer program causing the implementation, by the processor 301, of the steps and methods described below in relation to FIG. 6.

All or some of the steps and methods described below in relation to FIG. 6 can thus be implemented in software form by executing a set of instructions by a programmable machine, such as a DSP (digital signal processor), or a microcontroller, or be implemented in hardware form by a machine or a dedicated component (chip) or a dedicated set of components (chipset) such as an FPGA (field-programmable gate array) or an ASIC (application-specific integrated circuit). In general terms, meter data management system MDMS comprises electronic circuitry arranged and configured to implement the following steps and methods in relation to FIG. 6.

Figure 4:
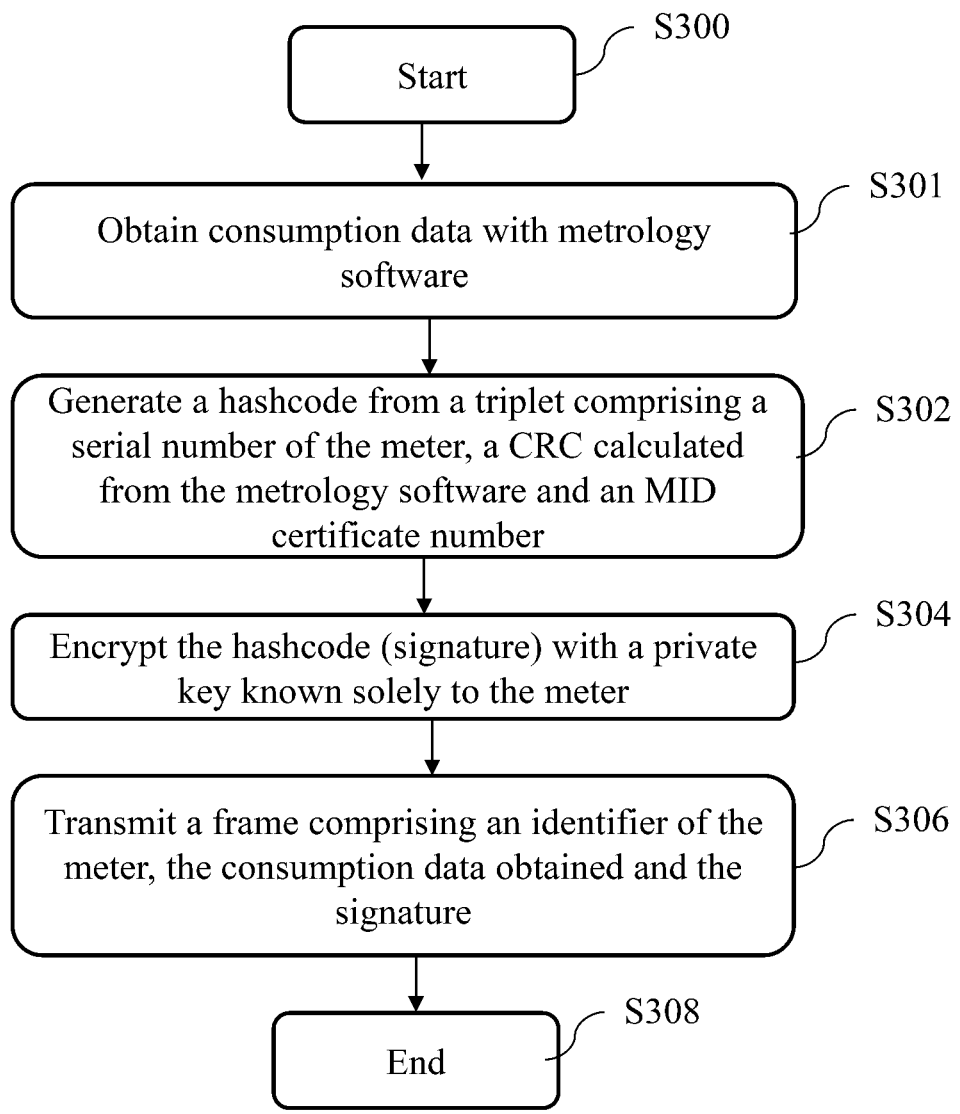
FIG. 4 illustrates a method for transmitting consumption data by a meter according to a particular embodiment.

FIG. 4 illustrates a method for transmitting consumption data, denoted Idx, by a meter according to a particular embodiment. The consumption data is for example an index of an electricity, water etc meter.

The method starts in a step S300.

In a step S301, the meter obtains consumption data by means of metrology software.

In a step S302, the meter generates a hashcode denoted HASH from a triplet comprising its serial number, a cyclic redundancy code or CRC calculated from the metrology software used by the meter and an MID certificate number attributed to the meter, said certificate certifying that said meter is authorised to be used for operations of invoicing of consumption. For this purpose, a hash function is used, e.g. a function of the SHA-2 family. The term hash function H(.) is given to a particular function that, from data supplied as an input, calculates a numerical hashcode serving to quickly identify the initial data. In other words a unique hashcode, i.e. the result of the hash function, corresponds to a given triplet. Consequently, for two different triplets T1 and T2, the meter generates two hashcodes S1=H(T1) and S2=H(T2) where S1 and S2 are different. In one embodiment, the function H(.) is function of the SHA-2 family, e.g. SHA-224, SHA-256, SHA-384 or SHA-512. In the case where the function H(.) is of the SHA-256 type, the hashcode obtained HASH comprises 256 bits. In the case where the function H is of the SHA-512 type, the hashcode obtained HASH comprises 512 bits. Other functions can be used, e.g. an SHA-3 function, an MD4 function, an MD5 function, an SHA-1 function, all well known in the cryptography field; these examples obviously not being limitative.

In a variant embodiment, an optional padding step is applied to the triplet in order to obtain an integer number of bytes before applying the hash function H(.).

In a step S304, the meter encrypts the hashcode generated with a private key known solely to the meter. The encrypted hashcode is a signature and is denoted HASH'. This private key was previously generated by the meter from its serial number. In a particular embodiment, the private key is generated by applying an exclusive OR operator between a random value of N bits particular to the meter and H(serial number), e.g. N=265 and H( ) is the SHA-265 function for obtaining a private key of 265 bits. A public key, known in particular to the key-management system KMS, is associated with this private key. The encryption is an asymmetric encryption, e.g. with elliptic curves or RSA. Asymmetric encryption is a technique that uses two encryption keys: a public key and a private key. The public key is shared without restriction whereas the private key is known solely to the meter that generated it. The public key associated with the private key of a meter is in particular known to the IS, more particularly to the key management system KMS. Thus the meter uses its private key to encrypt the hashcode HASH in order to obtain a signature HASH' that the destination, in this case the meter data management system MDMS, can decrypt with the public key of the meter that it will have recovered from the KMS and thus authenticate the meter sending the frame.

The use of an elliptic curve encryption advantageously makes it possible to limit the size of the HASH' signature. This is because asymmetric encryption of the RSA type uses larger keys, e.g. from 2048 to 8192 bits, than an elliptic curve asymmetric encryption, which uses encryption keys of size 256 to 384 bits. The size of HASH' depends firstly on the size of HASH and secondly on the size of the private key of the meter. Thus, when the hashcode HASH and the private key of the meter are each in 256 bits, the size of the signature HASH' is 512 bits. When HASH and the private key of the meter are each in 384 bits, the size of HASH' is 768 bits.

Figure 5:
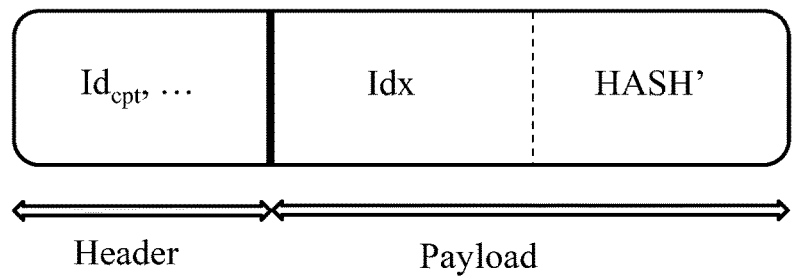
FIG. 5 illustrates a frame transmitted by a meter intended for a meter data management system

In a step S306, the meter transmits a frame T comprising a header and a payload to the meter data management system MDMS. Such a frame T is illustrated by FIG. 5. The frame is generated in accordance with a communication protocol such as G3-PLC, PRIME, 2G, 3G, 4G or 5G. The header of the frame comprises in particular an identifier of the meter $Id_{cpt}$ that transmits the frame and other data, e.g. synchronisation data and control data required for demodulating the data frame, which depend on the communication protocol used for the transmission. The payload comprises the HASH' signature and the consumption data Idx of the meter. The frame is transmitted in accordance with the communication protocol selected at the meter data management system MDMS for example via a data concentrator as illustrated on FIG. 1.

The method ends at a step S308.

This method is particularly advantageous since only the consumption data is transmitted in the payload of the frame. This is because the CRC of the metrology software and the MID certificate number are not transmitted. The network load is therefore alleviated thereby.

Figure 6:
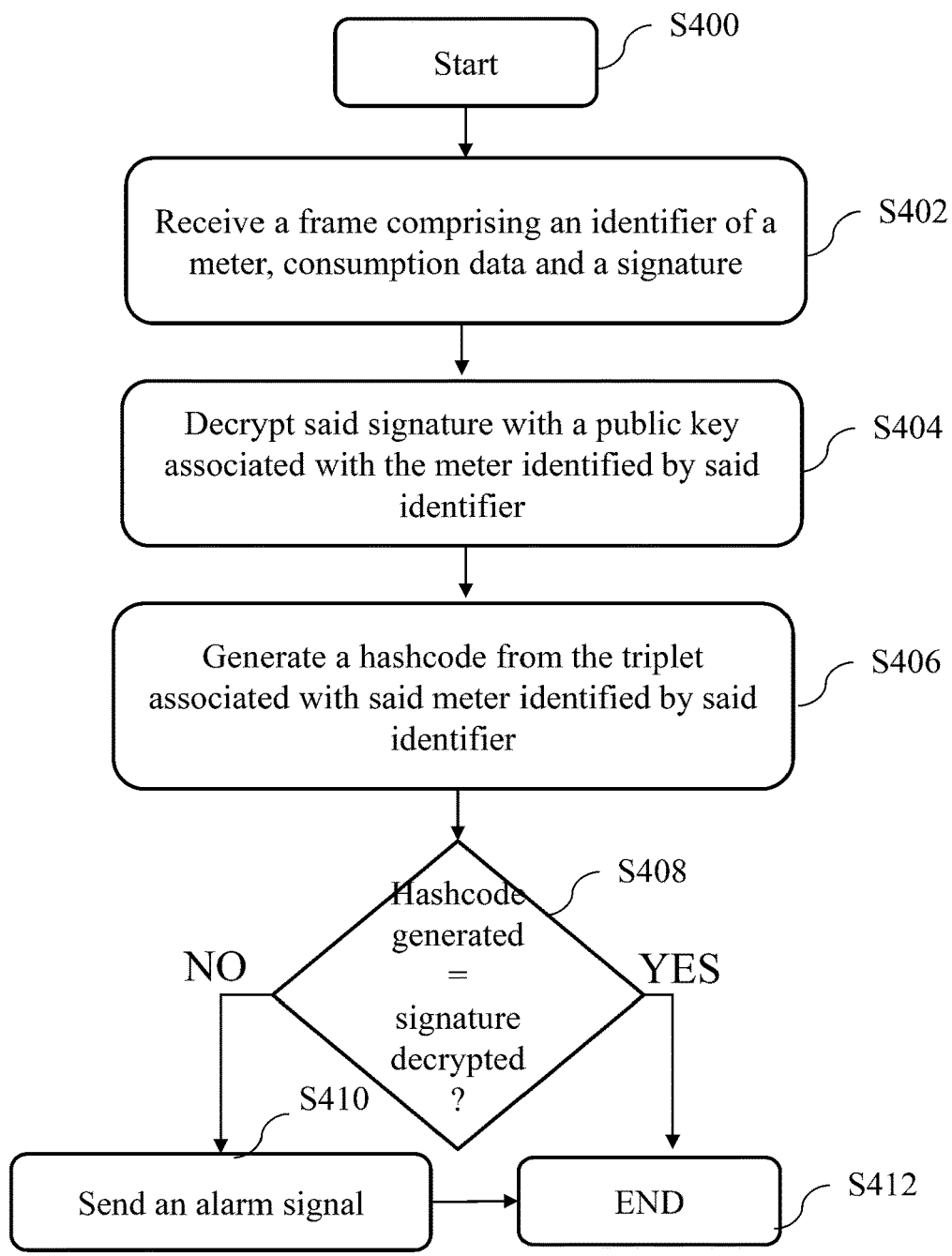
FIG. 6 illustrates a method for receiving consumption data by a system for managing consumption data according to a particular embodiment.

FIG. 6 illustrates a method for receiving consumption data coming from a meter by a meter data management system according to a particular embodiment. The method is implemented in the information system IS, more particularly by the meter data management system MDMS of the information system IS. The meter data management system MDMS comprises in particular a non-volatile memory wherein the serial numbers of the meters registered with the information system IS are stored. For each meter and therefore for each serial number the meter data management system MDMS also stores an MID certificate number and a CRC of the metrology software.

The method starts in a step S400.

In a step S402, the meter data management system MDMS receives the frame T comprising in its payload a signature HASH' and consumption data of the meter and in its header the identifier $Id_{cpt}$ of the meter.

In a step S404, the meter data management system MDMS decrypts said signature with a public key associated with the meter identified in the header of the frame by the identifier $Id_{cpt}$. This is because, from the identifier $Id_{cpt}$ of the meter present in the header of the frame, the MDMS finds the serial number of the meter and then the associated public key. The MDMS informs the KMS that it wishes to recover the public key associated with the meter identified by its serial number and/or by the identifier $Id_{cpt}$. The MDMS sends a request to this effect to the KMS, which in return sends it the public key associated with the meter. This public key is used for decrypting the received signature HASH'.

In a step S406, the MDMS generates a hashcode HASH" from the triplet associated with the meter identified $Id_{cpt}$. The triplet comprises the serial number, the CRC of the metrology software and the MID certificate number associated with the meter identified by $Id_{cpt}$, data that are stored in a non-volatile memory of the MDMS. In other words, the MDMS performs the same operation as the meter at the step S302 with the data, i.e. serial number, CRC of the metrology software and MID certificate number, which it has available for the meter identified by $Id_{cpt}$. In particular, the MDMS, at the step S406, uses the same HASH function as the one used at the step S302.

In a step S408, the MDMS compares the hashcode HASH" generated at the step S406 with the hashcode that is the result of the signature HASH' decrypted at the step S404. In the event of equality, the method continues at the step S412. This is because, in the event of equality, the MDMS is certain that the consumption data present in the payload of the frame T does indeed come from the correct meter, i.e. from the meter supposed to have sent said consumption data, and that furthermore this consumption data was obtained by a correct version of the metrology software. In the event of inequality the method continues at the step S410.

At the step S410, the MDMS sends an alarm signal to the information system IS 110 to indicate that the consumption data received poses a problem either because it does not come from the meter from which it is supposed to come or because the metrology software used for obtaining the consumption data is not correct, e.g. that it is a case of a wrong version of the metrology software.

The method ends at a step S412.

The methods described with reference to FIGS. 4 and 6 operate in the case of downloading of new metrology software into a meter. When new metrology software is downloaded into a meter, the private and public keys are advantageously kept. In a variant, said keys are renewed. In the latter case, in order to supply the new public key to the IS, the new public key is signed with the new private key and the whole is re-signed with the old private key so as to certify that the new public key does indeed come from the correct meter, said new public key for its part being transmitted in clear to the KMS.

With reference once again to FIG. 1, we shall consider that the meter 140a implements the method described with reference to FIG. 4. Thus the meter 140a generates a frame T comprising in its payload electrical consumption data, and a signature obtained by performing steps S302 and S304. The meter 140a next transmits its frame, for example over the electricity network, by powerline, to the data concentrator DC 120a. The frame generated is for example in accordance with the G3-PLC or PRIME communication protocol.

The data concentrator DC 120a receives the frame T and retransmits it over the communication network NET 101, e.g. a cellular network of the GPRS type, to the information system IS 110, or more precisely to the HES of the information system IS 110. For this purpose, the data contained in the frame T received are recovered to be de-encapsulated and then re-encapsulated in a frame compatible with the communication network NET 101.

The HES of the IS that is at the head end receives the frame T and transmits it to the MDMS.

The MDMS recovers from the KMS the public key necessary for verifying the signature contained in the payload of the frame "A".

Figure 7:
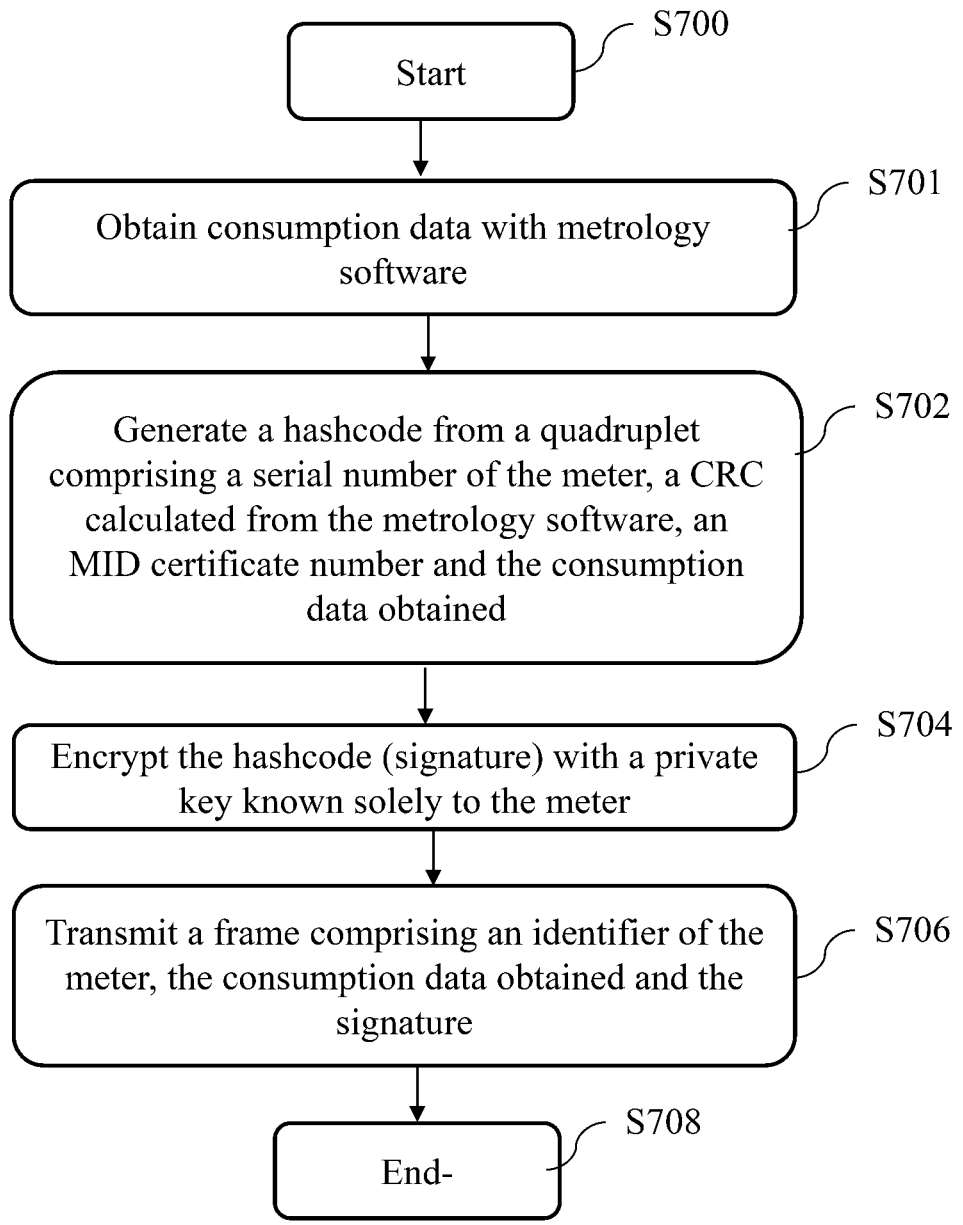
FIG. 7 illustrates a method for transmitting consumption data by a meter according to a particular embodiment.

FIG. 7 illustrates a method for transmitting consumption data, denoted Idx, by a meter according to a particular embodiment. The consumption data is for example an index of an electricity, water etc meter.

The method starts in a step S700.

In a step S702, the meter generates a hashcode denoted HASH from a quadruplet comprising its serial number, a cyclic redundancy code or CRC calculated from the metrology software used by the meter, an MID certificate number attributed to the meter and said consumption data Idx, said certificate certifying that said meter is authorised to be used for operations of invoicing of consumption. For this purpose, a hash function is used, e.g. a function of the family SHA-2. The term hash function H(.) is given to a particular function that, from data supplied as an input, calculates a numerical hashcode serving to quickly identify the initial data. In other words a unique hashcode, i.e. the result of the hash function, corresponds to a given quadruplet. Consequently, for two different quadruplets T1 and T2, the meter generates two hashcodes S1=H(T1) and S2=H(T2) where S1 and S2 are different.

In one embodiment, the function H(.) is function of the SHA-2 family, e.g. SHA-224, SHA-256, SHA-384 or SHA-512. In the case where the function H(.) is of the SHA-256 type, the hashcode obtained HASH comprises 256 bits. In the case where the function H is of the SHA-512 type, the hashcode obtained HASH comprises 512 bits. Other functions can be used, e.g. an SHA-3 function, an MD4 function, an MD5 function, an SHA-1 function, all well known in the cryptography field; these examples obviously not being limitative.

In a variant embodiment, an optional padding step is applied to the quadruplet in order to obtain an integer number of bytes before applying the hash function H(.).

In a step S704, the meter encrypts the hashcode generated with a private key known solely to the meter. The encrypted hashcode is a signature and is denoted HASH'. This private key was previous generated by the meter from its serial number. In to a particular embodiment, the private key is generated by applying an exclusive OR operator between a random value of N bits particular to the meter and H(serial number), e.g. N=265 and HO is the SHA-265 function for obtaining a private key of 265 bits. A public key known in particular to the key-management system KMS is associated with this private key. The encryption is an asymmetric encryption, e.g. with elliptic curves or RSA. Asymmetric encryption is a technique that uses two encryption keys: a public key and a private key. The public key is shared without restriction whereas the private key is known solely to the meter that generated it. The public key associated with the private key of a meter is in particular known to the IS, more particularly to the key management system KMS. Thus the meter uses its private key to encrypt the hashcode HASH in order to obtain a signature HASH' that the destination, in this case the meter data management system MDMS, can decrypt with the public key of the meter that it will have recovered from the KMS and thus authenticate the meter sending the frame.

The use of an elliptic curve encryption advantageously makes it possible to limit the size of the HASH' signature. This is because asymmetric encryption of the RSA type uses larger keys, e.g. from 2048 to 8192 bits, than an elliptic curve asymmetric encryption, which uses encryption keys of size 256 to 384 bits. The size of HASH' depends firstly on the size of HASH and secondly on the size of the private key of the meter. Thus, when the hashcode HASH and the private key of the meter are each in 256 bits, the size of the signature HASH' is 512 bits. When HASH and the private key of the meter are each in 384 bits, the size of HASH' is 768 bits.

In a step S706, the meter transmits a frame T comprising a header and payload to the meter data management system MDMS. Such a frame T is illustrated by FIG. 5. The frame is generated in accordance with a communication protocol such as G3-PLC, PRIME, 2G, 3G, 4G or 5G. The header of the frame comprises in particular an identifier of the meter $Id_{cpt}$ that transmits the frame and other data, e.g. synchronisation data and control data required for demodulating the data frame, which depend on the communication protocol used for the transmission. The payload comprises the HASH' signature and the consumption data Idx of the meter. The frame is transmitted in accordance with the communication protocol selected at the meter data management system MDMS for example via a data concentrator as illustrated on FIG. 1.

The method ends at a step S708. Thus, in this embodiment, the consumption data, in addition to being transmitted, is used for generating the signature HASH'.

This method is particularly advantageous since only the consumption data is transmitted in the payload of the frame. This is because the CRC of the metrology software and the MID certificate number are not transmitted. The network load is therefore alleviated thereby.

Figure 8:
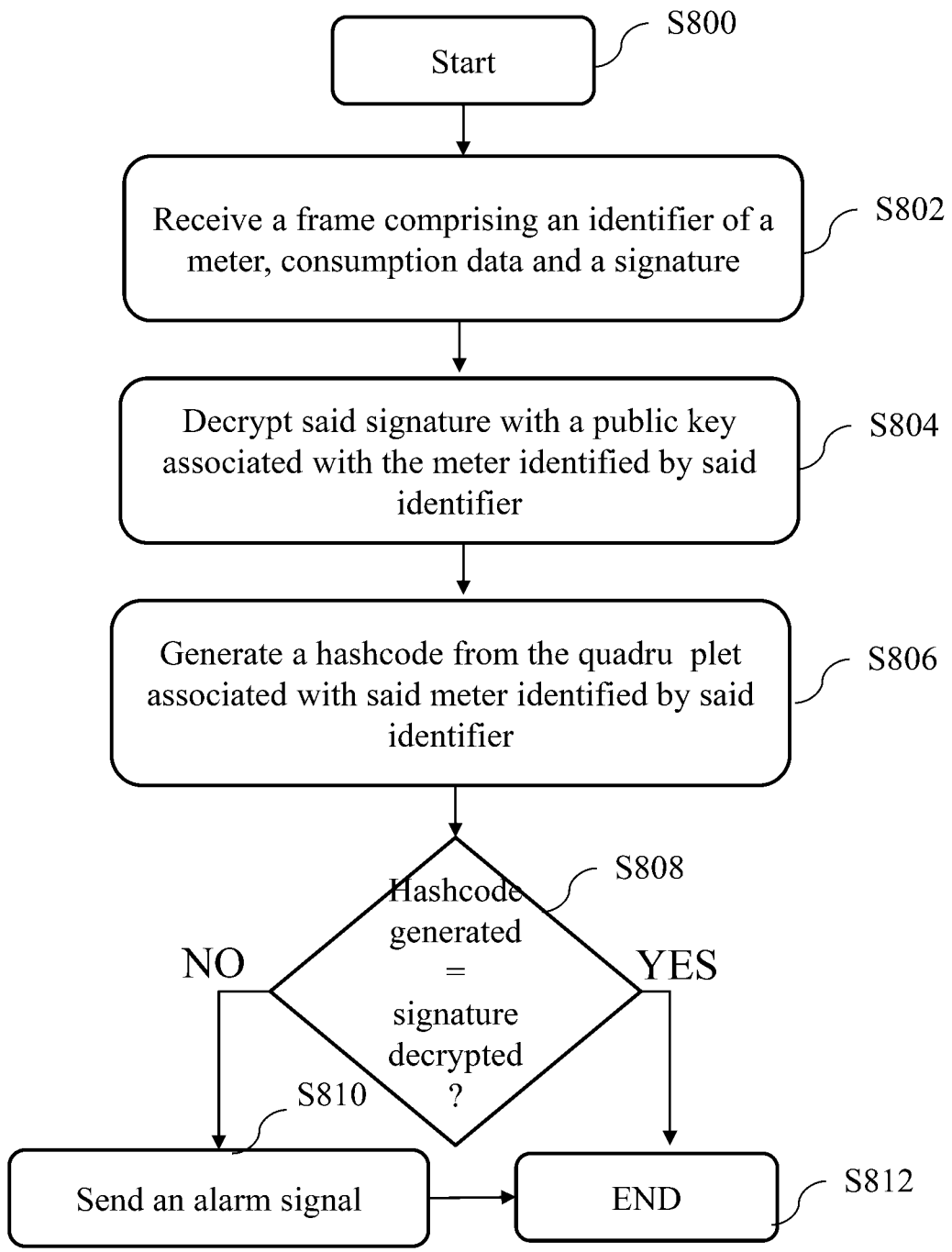
FIG. 8 illustrates a method for receiving consumption data by a system for managing consumption data according to a particular embodiment.

FIG. 8 illustrates a method for receiving consumption data coming from a meter by a meter data management system according to a particular embodiment. The method is implemented in the information system IS, more particularly by the meter data management system MDMS of the information system IS. The meter data management system MDMS comprises in particular a non-volatile memory wherein the serial numbers of the meters registered with the information system IS are stored. For each meter and therefore for each serial number the meter data management system MDMS also stores an MID certificate number and a CRC of the metrology software.

The method starts in a step S800.

In a step S802, the meter data management system MDMS receives the frame T comprising in its payload a signature HASH' and consumption data of the meter and in its header the identifier $Id_{cpt}$ of the meter.

In a step S804, the meter data management system MDMS decrypts said signature with a public key associated with the meter identified in the header of the frame by the identifier $Id_{cpt}$. This is because, from the identifier $Id_{cpt}$ of the meter present in the header of the frame, the MDMS finds the serial number of the meter and then the associated public key. The MDMS informs the KMS that it wishes to recover the public key associated with the meter identified by its serial number and/or by the identifier $Id_{cpt}$. The MDMS sends a request to this effect to the KMS, which in return sends it the public key associated with the meter. This public key is used for decrypting the received signature HASH'.

In a step S806, the MDMS generates a hashcode HASH" from the quadruplet associated with the meter identified $Id_{cpt}$. The quadruplet comprises the serial number of the meter, the CRC of the metrology software, the MID certificate number associated with the meter identified by $Id_{cpt}$, and the consumption data of the meter coming from the frame received by said MDMS, data that are stored in a non-volatile memory of the MDMS. In other words, the MDMS performs the same operation as the meter at the step S702 with the data, i.e. the serial number, the CRC of the metrology software, the consumption data Idx and the MID certificate number, which it has available for the meter identified by $Id_{cpt}$. In particular, the MDMS, at the step S806, uses the same HASH function as the one used at the step S702.

In a step S808, the MDMS compares the hashcode HASH" generated at the step S806 with the hashcode that is the result of the signature HASH' decrypted at the step S804. In the event of equality, the method continues at the step S812. This is because, in the event of equality, the MDMS is certain that the consumption data present in the payload of the frame T does indeed come from the correct meter, i.e. from the meter supposed to have sent said consumption data, and that furthermore this consumption data was obtained by a correct version of the metrology software. In the event of inequality the method continues at the step S810.

At the step S810, the MDMS sends an alarm signal to the information system IS 110 to indicate that the consumption data received poses a problem either because it does not come from the meter from which it is supposed to come or because the metrology software used for obtaining the consumption data is not correct, e.g. that it is a case of a wrong version of the metrology software.

The method ends at a step S812.

The methods described with reference to FIGS. 7 and 8 operate in the case of downloading of new metrology software into a meter. When new metrology software is downloaded into a meter, the private and public keys are advantageously kept. In a variant, said keys are renewed. In the latter case, in order to supply the new public key to the IS, the new public key is signed with the new private key and the whole is re-signed with the old private key so as to certify that the new public key does indeed come from the correct meter, said new public key for its part being transmitted in clear to the KMS.

With reference once again to FIG. 1, we shall consider that the meter 140a implements the method described with reference to FIG. 7. Thus the meter 140a generates a frame T comprising in its payload electrical consumption data, and a signature obtained by performing steps S702 and S704. The meter 140a next transmits its frame, for example over the electricity network, by powerline, to the data concentrator DC 120a. The frame generated is for example in accordance with the G3-PLC or PRIME communication protocol.

The data concentrator DC 120a receives the frame T and retransmits it over the communication network NET 101, e.g. a cellular network of the GPRS type, to the information system IS 110, or more precisely to the HES of the information system IS 110. For this purpose, the data contained in the frame T received are recovered to be de-encapsulated and then re-encapsulated in a frame compatible with the communication network NET 101.

The HES of the IS that is at the head end receives the frame T and transmits it to the MDMS.

The MDMS recovers from the KMS the public key necessary for verifying the signature contained in the payload of the frame "A".

The invention claimed is:

1. A method for transmitting consumption data by a meter to a meter data management system, comprising the following steps implemented by said meter:
   obtaining consumption data, said data being obtained by a metrology software;
   generating a hashcode from a quadruplet comprising said consumption data obtained and a triplet comprising a serial number of said meter, a cyclic redundancy code calculated from said metrology software and a certificate number certifying that said meter is authorised to be used for invoicing consumption;
   encrypting said hashcode with a private key known solely to the meter, said encrypted hashcode being a signature; and
   transmitting to the system managing said consumption data, a frame comprising an identifier of said meter, said consumption data obtained and said signature.

2. The transmission method according to claim 1, wherein generating a hashcode comprises applying a hash function to said quadruplet.

3. The transmission method according to, claim 1, wherein the hash function belongs to the set of hash functions comprising:
SHA-224 of the family SHA-3;
SHA-256 of the family SHA-3;
SHA-384 of the family SHA-3;
SHA-512 of the family SHA-3;
SHA-224 of the family SHA-2;
SHA-256 of the family SHA-2;
SHA-384 of the family SHA-2;
SHA-512 of the family SHA-2;
MD-4;
MD-5; and
SHA-1.

4. The transmission method according to claim 1, wherein encrypting said hashcode with a private key known solely to the meter comprises applying an elliptic curve asymmetric encryption.

5. The transmission method according to claim 1, wherein said consumption data are data on consumption of electricity, gas, petrol, thermal energy or water.

6. A non-transitory storage medium storing a computer program comprising instructions for implementing the transmission method or the reception method according to claim 1, when said program is executed by a processor.

7. A method for receiving consumption data by a system for managing said consumption data, said system for managing said consumption data storing in memory, for each meter in a set of meters, a triplet comprising a serial number of said meter, a cyclic redundancy code of a metrology software and an associated certificate number certifying that said meter is authorised to be used for invoicing consumption, said method comprising the following steps performed by said system for managing said consumption data:
  receiving a frame comprising an identifier of a meter, consumption data and a signature;
  decrypting said signature with a public key associated with the meter identified by said identifier;
  generating a hashcode from a quadruplet comprising said triplet and said consumption data obtained, said triplet being associated in said memory with said meter identified by said identifier;
  comparing said decrypted signature and said generated hashcode and, in the case of inequality, sending an alarm signal.

8. A method for transmitting consumption data by a meter to a system for managing said consumption data, said system for managing said consumption data storing in memory, for each meter in a set of meters, a triplet comprising a serial number of said meter, a cyclic redundancy code of a metrology software and an associated certificate number certifying that said meter is authorised to be used for invoicing consumption, said method comprising the following steps performed by said meter:
  obtaining consumption data, said data being obtained by metrology software;
  generating a hashcode from a quadruplet comprising said consumption data obtained and a triplet comprising a serial number of said meter, a cyclic redundancy code calculated from said metrology software and a certificate number certifying that said meter is authorised to be used for invoicing consumption;
  encrypting said hashcode with a private key known solely to the meter, said encrypted hashcode being a signature; and
  transmitting to the system managing said consumption data, a frame comprising an identifier of said meter, said consumption data obtained and said signature,
  said method further comprises the following steps performed by said system for managing said consumption data:
  receiving said frame;
  decrypting said signature with a public key associated with the meter identified by said identifier;
  generating a hashcode from said quadruplet comprising said triplet and said consumption data obtained, said triplet being associated in said memory with said meter identified by said identifier;
  comparing said decrypted signature and said generated hashcode and, in the case of inequality, sending an alarm signal.

9. A meter configured to transmit consumption data to a system for managing said consumption data, comprising electronic circuitry arranged and configured for:
  obtaining consumption data, said data being obtained by a metrology software;
  generating a hashcode from a quadruplet comprising said consumption data obtained and a triplet comprising a serial number of said meter, a cyclic redundancy code calculated from said metrology software and a certificate number certifying that said meter is authorised to be used for invoicing consumption;
  encrypting said hashcode with a private key known solely to the meter, said encrypted hashcode being a signature; and
  transmitting, to the system managing said consumption data, a frame comprising an identifier of said meter, said consumption data obtained and said signature.

10. An automated management system configured to make a remote collection of consumption data, said automated management system comprising the meter according to claim 9 and a meter data management system comprising a serial number of said meter, a cyclic redundancy code of a metrology software and an associated certificate number certifying that said meter is authorised to be used for invoicing consumption, said meter data management system comprising electronic circuitry arranged and configured for:
  receiving a frame comprising an identifier of a meter, consumption data and a signature;
  decrypting said signature with a public key associated with the meter identified by said identifier;
  generating a hashcode from a quadruplet comprising said consumption data obtained and a triplet associated in said memory with said meter identified by said identifier;
  comparing said decrypted signature and said generated hashcode and, in the case of inequality, sending an alarm signal.

11. A system for managing data from meters storing in memory, for each meter in a set of meters, a triplet comprising a serial number of said meter, a cyclic redundancy code of a metrology software and an associated certificate number certifying that said meter is authorised to be used for invoicing consumption, said meter data management system comprising electronic circuitry arranged and configured to:
  receiving a frame comprising an identifier of a meter, consumption data and a signature;
  decrypting said signature with a public key associated with the meter identified by said identifier;

generating a hashcode from a quadruplet comprising said triplet and said consumption data obtained, said triplet being associated in said memory with said meter identified by said identifier;

comparing said decrypted signature and said generated hashcode and, in the case of inequality, sending an alarm signal.

* * * * *